July 7, 1959  R. C. BAIRD  2,893,509
VIBRATION FREE APPARATUS
Filed March 28, 1956  2 Sheets-Sheet 2
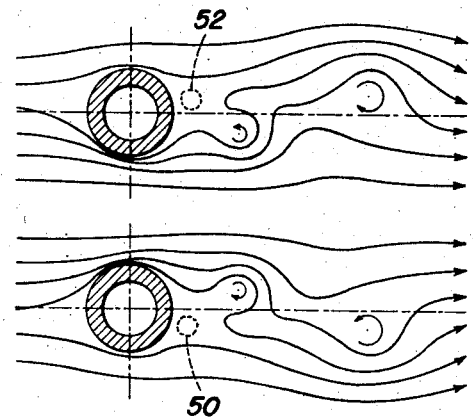
Fig. 6a.
Fig. 6b.
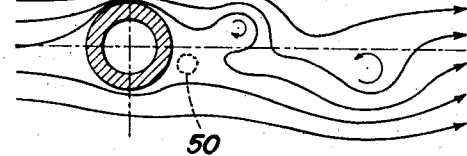
Fig. 2.
Fig. 4.
Fig. 3.
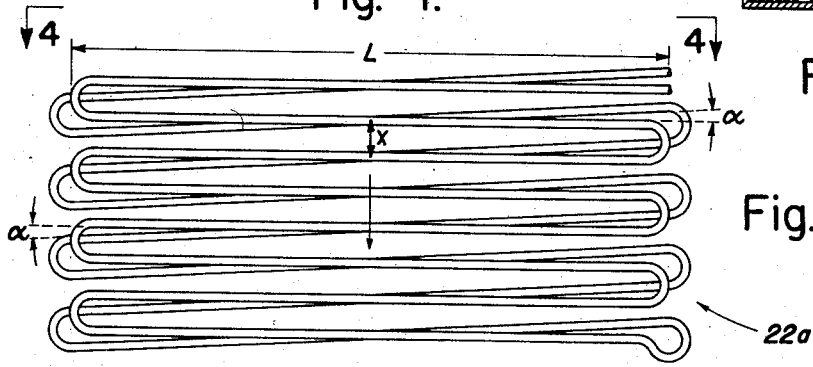
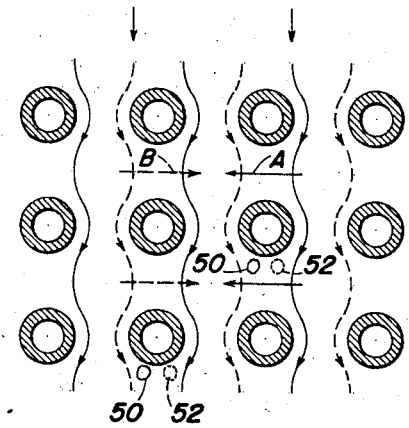
Fig. 5.
INVENTOR.
Raymond C. Baird
BY Eldon H. Luther
ATTORNEY United States Patent Office 2,893,509
Patented July 7, 1959

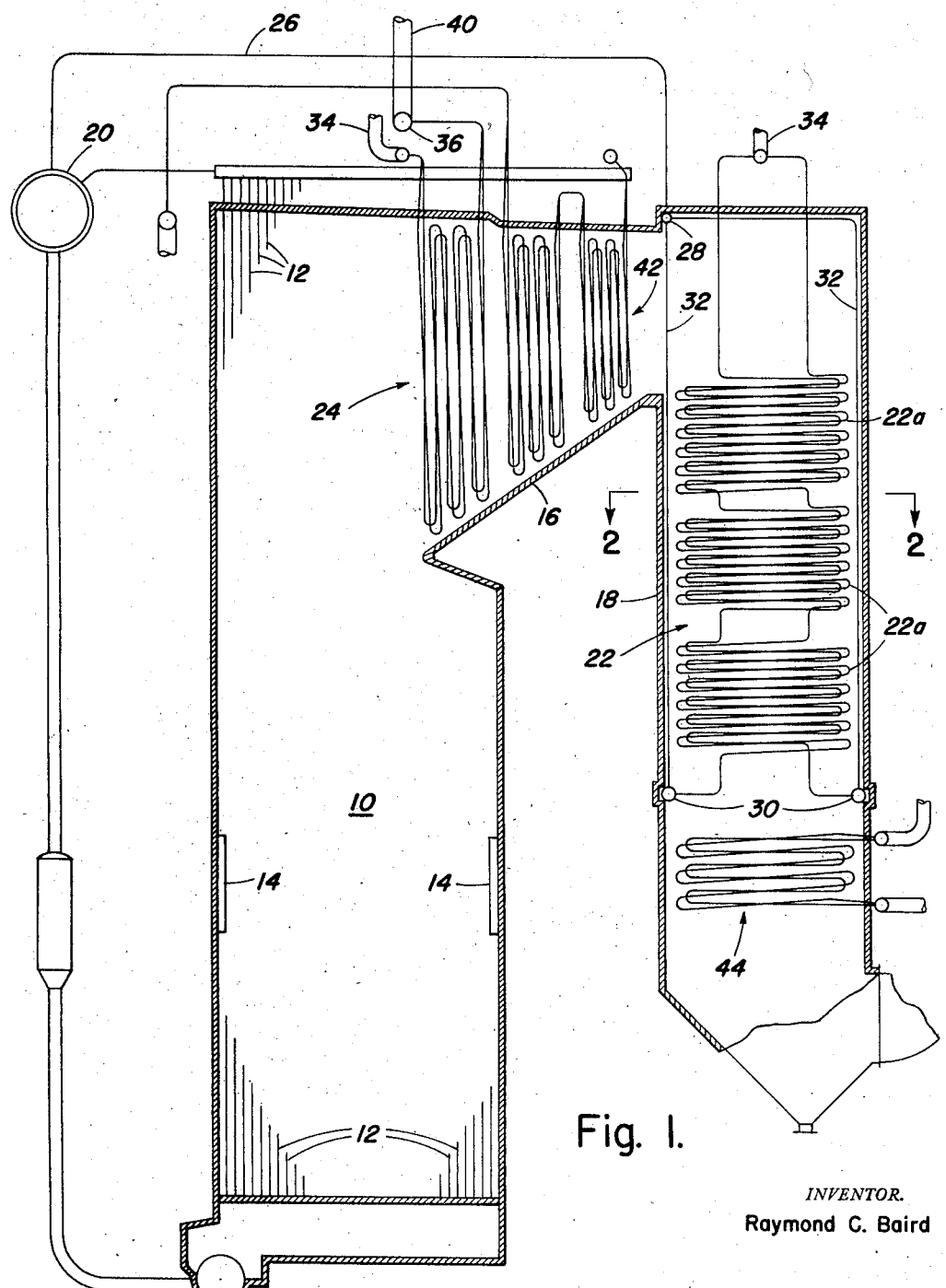
Fig. I.

2,893,509

VIBRATION FREE APPARATUS

Raymond C. Baird, Santa Monica, Calif., assignor to Combustion Engineering, Inc., New York, N.Y., a corporation of Delaware Application March 28, 1956, Serial No. 574,536

1 Claim. (Cl. 181—46)

This invention relates to the problem of vibration produced as a result of a gas passing through a duct and over a tubular bundle or bundles extending generally transversely of the duct with the invention having particular relation to a novel organization for eliminating or preventing the formation of a standing pressure wave of large amplitude in resonance with the acoustical chamber formed by the duct.

There are many instances in industrial equipment wherein a bundle of closely spaced tubes are positioned in a duct through which a gas or gases at relatively high velocities are conveyed with the tubes being positioned generally transversely of the duct and accordingly of the direction of gas flow. One of the more prominent industrial applications of such an organization is a modern high capacity steam generator where it is common practice to arrange a large portion of the heat exchange surface of the generator in this manner. With this type of construction it has been found that as a result of gas flow instability, caused by the gas flowing over the transversely disposed tubular elements, large amplitude pulsations may develop which are in acoustical resonance with the chamber formed by the duct and which cause very severe vibration as well as intense noise. This phenomenon has been recently experienced in the low temperature superheater and economizer section of a modern steam generator such as shown in Fig. 1 of the drawing. This result arises from a particular combination of design dimensions with gas flow rate and acoustical characteristics of the duct. The demand for higher and higher capacity steam generating plants tends to bring the necessary design and operating conditions of these plants to a point where they are more and more likely to result in severe gas pulsations with associated vibration and noise.

It is an object of this invention to provide an arrangement for preventing large amplitude gas pulsations from developing as a result of gas flow instability occasioned by the passing of gas around transversely disposed tubular members in a duct.

The invention will be more fully understood from the following description when considered in conjunction with the accompanying drawing forming a part thereof and in which:

Fig. 1 is a diagrammatic representation of a vertical section of a modern steam generator.

Fig. 2 is a sectional view taken along line 2—2 of Fig. 1.

Fig. 3 is a detailed vertical sectional view of a portion of one of the heat exchange bundles positioned in the vertical gas pass and showing the detailed construction thereof in accordance with the method of this invention.

Fig. 4 is a view taken from line 4—4 of Fig. 3.

Fig. 5 is a diagrammatic representation showing how the instability pulses are formed.

Figs. 6a and 6b are detailed diagrammatic representations of the streamline flow pattern of a single tube and showing the alternate disposition of the vortices formed downstream of the tube.

While the organization of the invention will be described in relation to a steam generator and particularly to the tube bundles positioned in the gas pass leading from the furnace of such a generator it is to be understood that the relation with a steam generator is employed for the purpose of explanation only and although a very severe instance of the problem to which the invention is directed has recently occurred in this environment, it is to be understood that the invention has other and broader applications and may be utilized wherever the pulsation problem to which the invention is directed may possibly be manifest.

Referring to the drawing and particularly to Fig. 1 thereof, the steam generator illustratively disclosed therein comprises a furnace 10 which is lined with vertically disposed steam generating tubes 12 and which is fired by means of the burners 14. The combustion gases evolved by the burning of fuel within the furnace pass upwardly through the furnace and out through the gas pass or duct 16 which is connected to the upper end of the vertically disposed gas pass or duct 18 with the combustion gases after passing horizontally through duct 16 being conveyed downwardly through this duct 18 and out the bottom thereof to a suitable stack or other heat exchange apparatus. The steam that is generated in tubes 12 is collected in steam and water drum 20 where it is separated from the circulating water by means of suitable apparatus with the steam then being conveyed to the superheater of the steam generator where it is superheated as required for delivery to the turbine or the like.

In the illustrative organization the superheater is made up of low temperature section 22 which is positioned within vertical gas pass 18 and high temperature section 24 positioned at the outlet of furnace 10 and within the gas pass 16. These low and high temperature superheater sections are each made up of a large number of tubes which are sinuously bent with the tubes being disposed in vertical planes spaced across the gas pass so as to form tube bundles with the tubular elements thereof in closely spaced relation. As is indicated in Fig. 1 it is the general practice to provide one or more wide vertical spaces within the low temperature superheater tube bundle 22 so as to form what is in effect spaced tube bundles 22a with there being three such bundles in the illustrative superheater section 22. This particular construction simplifies both the fabrication of the rather large low temperature superheater section as well as the physical support thereof.

The saturated steam from drum 20 is conveyed via conduits 26 to the intermediate header 28 from which it passes to distribution headers 30 through conduits 32. From these headers 30 the steam passes through the tubes of low temperature superheater section 22 after which it is conveyed through conduit 34 to the high temperature section 24. The partially superheated steam is finally superheated to its desired temperature upon passing through this high temperature superheat section with this steam being collected in header 36 from which it is conveyed to the turbine through conduit 40. After a portion of the energy of the steam has been utilized it is returned to the generator for reheating in the reheater 42 which is constructed of sinuously bent tubes in the same manner as the superheater and is positioned in duct 16 immediately to the rear of high temperature superheater section 24. Positioned downstream of low temperature superheater section 22 is the economizer 44 by means of which the feed water for the steam generator is heated and which is likewise fabricated of sinuously bent tubes in the same manner as the superheater.

It has been the practice to make these various heat exchange portions of the generator, which are comprised of sinuously bent tubes, by arranging the tubes or the tube runs which extend across the gas pass in parallel relation with each other and transversely of the duct or passageway within which the tubes are disposed. Thus the tube runs in the economizer and the low temperature superheater were horizontal while the tube runs in the reheater and high temperature superheater were vertical. With this particular design severe pulsation-induced vibration and noise has occurred in the ducts within which these tube bundles are disposed to the point of endangering the physical structure of the boiler.

It has been found that this vibration was caused by a standing acoustical wave oriented transverse to the duct axis as a result of gas flow instability, which was of a frequency that was in resonance with the duct. The duct acted as a resonant chamber to amplify these instability forces which arise from flow over parallel heat exchange tubes causing the development of the rapidly varying standing wave pressure acting directly upon the walls of the duct.

When a gas flows transversely over a tube, lateral oscillatory pulses are generated that are of the same type that gives rise to the phenomenon frequently referred to in the literature as the "von Karman Trail." This is the fluid flow phenomenon which sometimes causes the destruction of smokestacks, suspension bridges and other large structures exposed to wind. Fig. 6a illustrates a typical instantaneous wind flow pattern in a plane perpendicular to the axis of a long cylinder. With the eddy swirling in the direction shown, there is instantaneously a velocity differential between the top and the bottom of the cylinder which results in a lateral displacement of the relatively low velocity zone 52 downwind of the obstacle. As the succeeding eddy forms this zone shifts laterally in the opposite direction to a position 50. Thus the production of the von Karman trail produces a laterally directed pulsating shift of the flowing gas downwind of the obstacle having a frequency equal to the eddy formation frequency. When, as in the case of the heat exchange bundles of a steam generator, there are numerous parallel tubes extending transversely of the gas flow the laterally directed pulsing occasioned by the alternating instability eddies results in a general pulsating shift of the gas stream as a whole transverse to the flow direction if the flow rate is such that the period of oscillation is approximately equal to the time required for the gas to pass between alternate rows of tubes. In such a tube bundle the acoustical coupling between the laterally adjacent tubes is sufficiently tight for causing the otherwise independent pulses to be forced into the same phase relationship with each other.

Fig. 5 represents instantaneous flow paths through such a tube bundle. When the streamline flow is as indicated by the solid line the low velocity zones 50 are situated as shown and the pulsating shifts of the gas as a whole has just occurred in the direction indicated by the arrow A. When the streamline flow is as indicated by the dotted line and the low velocity zones are at 52 the corresponding direction of the gas shift or pulsation is as indicated by arrow B.

The energy represented by these pulsations is, of itself, sufficiently small so as to cause little or no vibrational force. However, if there is coupled an acoustically resonant chamber "tuned" approximately to the instability generated pulse frequency a standing wave condition can be set up with an intensity dependent upon the strength of the gas pulsation and dissipative characteristics of the chamber. This has occurred in the duct of a boiler within which were disposed heat exchange tube bundles with the ampltiude of the pulsation measured at the end of a wall of the duct being ±3 pounds per square inch, which over a duct wall 34 feet wide and 70 feet high produces a tremendous instantaneous pressure acting thereon.

In accordance with the present invention an organization has been devised to prevent the development or building up of this standing wave and accordingly eliminate the source of this pulsation-induced vibration.

In a heat exchange bundle there are a number of physical factors which determine the frequency of vortex formation, the fundamental cause of the gas pulsations. One of these factors is the spacing of the tubes in relation to each other. When the heat exchange tubes are arranged in parallel relation the frequency of vortex formation with their attendent instability-generated pulses will be the same throughout the length of the transverse portion of the tube or in other words, the run of the tube extending across the duct. Because these frequencies are the same in such an instance they may be coupled together and then if they are in resonance with the chamber formed by the duct an intense standing wave may be developed. However, if the tube elements are not in parallel relation but are at a predetermined angle with relation to one another the vortex energy or instability-generated pulse will tend to have a frequency which varies throughout the length of such angularly disposed tubes making up the bundle. The angular relation between these tubes, identified as $\alpha$ in Fig. 3, should, in order to obtain this result, have a value approximately as follows:

$$\alpha = \tan^{-1} K \left[ \frac{x-d}{L} \right]$$

where L is the length of the shorter tube run (Fig. 3), $d$ is the diameter of the tubes, X is the distance between centers of adjacent tubes at midpoint (Fig. 3) and $K \cong 1$. Since with this angle a varying frequency throughout the length of the tube run is assured, by positioning a sufficient number of tubes in such angular relation so that there will be an insufficient amount of energy having a single frequency which may be in resonance with the chamber formed by the duct to establish a standing wave, the establishment or development of such a wave may be completely prohibited thereby preventing the development of pulsation-induced vibration such as have been encountered with heat exchange bundle organizations hereinbefore.

While the angular disposition of the tube members may be accomplished in a variety of ways, Fig. 3 depicts one simple manner in which this may be accomplished and wherein the transversely extending tube runs of adjacent sinuously bent tubes are positioned or arranged askew to each other with relation to the gas flow as shown. In this arrangement the tube runs are arranged in ranks across the gas stream in spaced side by side relation and aligned in files and equally spaced in the direction of flow of the gas stream with the tube runs in each respective file being parallel to each other and the tube runs in adjacent files being angularly disposed to each other.

It will be thus seen that with the organization of this invention pulsation-induced vibration resulting from a standing wave being established because of the development of an instability-generated pulse of sufficient energy when in resonance with the chamber formed by the duct to form such a standing wave is positively prevented by insuring that the instability-generated pulses at any particular frequency do not reach this energy level.

It will be understood that the above description is intended for the purpose of illustration only and that modifications such as will occur to those skilled in the art are possible and are embraced within the scope and spirit of the invention.

What is claimed is:

In combination a tube bundle disposed within a duct through which a gaseous stream is conveyed and wherein the tube runs of said bundle are disposed generally transversely of the direction of flow of said stream, with there being numerous tube runs arranged in ranks across the gas stream in spaced side by side relation and in aligned files and accordingly spaced in the direction of flow of the gas stream with the tube runs in each respective file being parallel to each other a sufficient number of adjacent side by side tube runs being disposed in angular relation to each other such that the vortex energy created by the fluid flowing over the runs is distributed through a range of frequencies and is not sufficiently concentrated at a single frequency to establish a standing wave in resonance with the chamber formed by the duct, with the approximate relative angular disposition of these adjacent tube runs being defined by $$\tan^{-1} K \frac{x-d}{L}$$

where L is the length of the shortest of the adjacent tube runs, $d$ is the diameter of the tube runs, $x$ is the distance between the centers of the two consecutive tube runs in the same file and $K \cong 1$.

References Cited in the file of this patent

UNITED STATES PATENTS

| | | |
|---|---|---|
| 1,281,247 | Winslow | Oct. 8, 1918 |
| 1,497,973 | Bryan | June 17, 1924 |
| 1,901,090 | Eule et al. | Mar. 14, 1933 |
| 2,056,862 | Markley | Oct. 6, 1936 |
| 2,200,156 | Cassidy | May 7, 1940 |
| 2,204,613 | Nelson et al. | June 18, 1940 |